United States Patent
Wilson et al.

(10) Patent No.: US 9,140,231 B1
(45) Date of Patent: Sep. 22, 2015

(54) CONTROLLER FOR A WAVE ENERGY CONVERTER

(71) Applicant: Sandia Corporation, Albuquerque, NM (US)

(72) Inventors: David G. Wilson, Tijeras, NM (US); Diana L. Bull, Albuquerque, NM (US); Rush D. Robinett, III, Tijeras, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 14/047,700

(22) Filed: Oct. 7, 2013

(51) Int. Cl.
*F03B 13/10* (2006.01)
*F03B 13/12* (2006.01)
*H02P 9/04* (2006.01)
*F03B 13/16* (2006.01)
*F03B 15/00* (2006.01)

(52) U.S. Cl.
CPC ................. *F03B 13/16* (2013.01); *F03B 15/00* (2013.01)

(58) Field of Classification Search
USPC ...................................................... 290/42, 53
See application file for complete search history.

(56) References Cited

U.S. PATENT DOCUMENTS

| | | | | |
|---|---|---|---|---|
| 3,696,251 A * | 10/1972 | Last et al. | ........ | 290/53 |
| 4,539,485 A * | 9/1985 | Neuenschwander | ............ | 290/53 |
| 7,140,180 B2 * | 11/2006 | Gerber et al. | ................... | 60/496 |
| 7,305,823 B2 * | 12/2007 | Stewart et al. | ................... | 60/495 |
| 7,440,807 B2 | 10/2008 | Kanaoka et al. | ............... | 700/45 |
| 7,759,814 B2 * | 7/2010 | Oigarden | ......... | 290/53 |
| 7,896,576 B2 * | 3/2011 | Jean et al. | ......... | 405/76 |
| 7,909,536 B2 * | 3/2011 | Dick | ............... | 405/76 |
| 8,013,462 B2 * | 9/2011 | Protter et al. | ................ | 290/53 |
| 8,067,849 B2 * | 11/2011 | Stewart | ............ | 290/53 |
| 8,121,708 B1 | 2/2012 | Wilson et al. | .................. | 700/45 |
| 8,264,093 B2 * | 9/2012 | Moore | ............ | 290/42 |
| 8,527,247 B1 | 9/2013 | Wilson et al. | ..................... | 703/9 |
| 8,587,139 B2 * | 11/2013 | Gerber | ............ | 290/42 |
| 8,614,520 B2 * | 12/2013 | Rohrer | ............ | 290/42 |
| 8,647,014 B2 * | 2/2014 | McCormick et al. | ......... | 405/27 |
| 8,723,351 B2 * | 5/2014 | Stewart et al. | ................. | 290/53 |
| 8,723,353 B1 * | 5/2014 | Franklin | ........ | 290/53 |
| 8,723,355 B2 * | 5/2014 | Eder et al. | ........ | 307/9.1 |
| 8,729,723 B2 * | 5/2014 | Boureau et al. | ................ | 290/55 |
| 8,904,778 B2 * | 12/2014 | Gerber et al. | .................. | 60/502 |
| 8,912,678 B2 * | 12/2014 | Nozawa | ............ | 290/53 |
| 2004/0163389 A1 * | 8/2004 | Gerber et al. | .................. | 60/595 |
| 2007/0068153 A1 * | 3/2007 | Gerber | ............ | 60/497 |
| 2007/0087756 A1 | 4/2007 | Hoffberg | ...................... | 455/450 |
| 2007/0206715 A1 | 9/2007 | Godes | .......... | 376/100 |
| 2007/0261404 A1 * | 11/2007 | Stewart et al. | ................ | 60/495 |
| 2007/0266704 A1 | 11/2007 | Bull et al. | ......... | 60/398 |
| 2007/0273156 A1 * | 11/2007 | Miyajima et al. | ................ | 290/53 |
| 2007/0286683 A1 | 12/2007 | Bull | .......... | 405/195.1 |
| 2008/0088134 A1 * | 4/2008 | Montgomery | ................. | 290/53 |
| 2008/0131208 A1 | 6/2008 | Bull | .......... | 405/195.1 |
| 2008/0238103 A1 * | 10/2008 | Montgomery | ................. | 290/53 |

(Continued)

OTHER PUBLICATIONS

Robinett, et al, "Renewable Systems integration and Microgrids", APCE Summit, 2011, pp. 1-30.

*Primary Examiner* — Pedro J Cuevas
(74) *Attorney, Agent, or Firm* — Daniel J. Jenkins

(57) ABSTRACT

A wave energy converter (WEC) is described, the WEC including a power take off (PTO) that converts relative motion of bodies of the WEC into electrical energy. A controller controls operation of the PTO, causing the PTO to act as a motor to widen a wave frequency spectrum that is usable to generate electrical energy.

20 Claims, 5 Drawing Sheets

(56) References Cited

U.S. PATENT DOCUMENTS

| | | | |
|---|---|---|---|
| 2008/0309088 A1* | 12/2008 | Agamloh et al. | 290/53 |
| 2009/0085357 A1* | 4/2009 | Stewart | 290/53 |
| 2009/0251258 A1* | 10/2009 | Rhinefrank et al. | 335/306 |
| 2009/0309366 A1* | 12/2009 | Moore | 290/53 |
| 2010/0117366 A1* | 5/2010 | Rhinefrank et al. | 290/53 |
| 2010/0126164 A1 | 5/2010 | Gerber et al. | 60/495 |
| 2010/0148504 A1* | 6/2010 | Gerber | 290/42 |
| 2010/0259047 A1 | 10/2010 | Chi et al. | 290/53 |
| 2010/0264659 A1 | 10/2010 | Chi et al. | 290/53 |
| 2011/0241347 A1* | 10/2011 | Boureau et al. | 290/53 |
| 2011/0299927 A1* | 12/2011 | McCormick et al. | 405/27 |
| 2012/0247096 A1* | 10/2012 | Gerber et al. | 60/496 |
| 2012/0248865 A1* | 10/2012 | Eder et al. | 307/9.1 |
| 2013/0113211 A1* | 5/2013 | Rohrer | 290/42 |
| 2013/0161948 A1* | 6/2013 | Sarokhan | 290/42 |
| 2014/0097617 A1* | 4/2014 | Rohrer | 290/42 |
| 2014/0138953 A1* | 5/2014 | Franklin | 290/53 |
| 2014/0265338 A1* | 9/2014 | Bretl et al. | 290/53 |
| 2015/0000263 A1* | 1/2015 | Foster | 60/504 |
| 2015/0076827 A1* | 3/2015 | Nair et al. | 290/53 |
| 2015/0082785 A1* | 3/2015 | Rohrer | 60/500 |
| 2015/0091304 A1* | 4/2015 | Madhi et al. | 290/53 |

* cited by examiner

CONTROLLER FOR A WAVE ENERGY CONVERTER

STATEMENT OF GOVERNMENTAL INTEREST

This invention was developed under Contract DE-AC04-94AL85000 between Sandia Corporation and the U.S. Department of Energy. The U.S. Government has certain rights in this invention.

BACKGROUND

Wave energy converters (WECs) are devices that extract energy from waves in an open body of water (e.g., the ocean). Due to the immensity of oceans, continuous movements of waves therein, etc., the amount of energy corresponding to waves (a wave resource) is substantial. Further, the wave resource has a relatively high energy density (higher than either solar or wind). For instance, along the coastal territory of the United States, there are approximately 300 GW of potential power that can be extracted from waves. The wave energy resource, however, is spatially, temporally, and energetically variable. For example, energy within a particular region of a body of water is dependent upon a predominant frequency of waves, wave height, and width of the wave frequency spectrum.

Conventionally, WECs produce power over a relatively narrow band of the full wave frequency spectrum. With more particularity, a conventional WEC is configured to have a structural resonant frequency that desirably matches the dominant frequency of waves in a region where the WEC is to be deployed. Thus, when a wave impacts the WEC that causes the WEC to be on resonance, the WEC can operate efficiently, and can absorb a significant amount of energy from the wave. If the WEC is off resonance—e.g., waves impact the WEC that cause the WEC to be off resonance—the WEC operates much less efficiently.

SUMMARY

The following is a brief summary of subject matter that is described in greater detail herein. This summary is not intended to be limiting as to the scope of the claims.

Described generally herein are various technologies pertaining to wave energy converters (WECs). More particularly, described herein are technologies pertaining to designing and implementing a controller in a WEC, wherein the controller is configured to improve efficiency of the WEC by expanding a wave frequency spectrum over which the WEC can efficiently absorb wave energy. Thus, the controller can be used to cause the WEC, over time, to increase electrical energy generated thereby relative to conventional WECs.

In an exemplary embodiment, the controller can be designed using a design process referred to as Hamiltonian Surface Shaping and Power Flow Control (HISSPFC). HISSPFC is a two-step control law design process. In a first step of the process, the WEC is modeled as a (nonlinear) Hamiltonian system, and the Hamiltonian system is treated as if it were a conservative system with no externally applied non-conservative forces. Such process enables the shaping of the Hamiltonian surface of the system with acceleration feedback and/or proportional feedback to create an isolated minimum (stable) energy state. Static stability can be utilized to find a first stability boundary; a rigid body mode (singular stiffness matrix), which defines the point of static neutral stability. In a second step of the process, controllers are designed and analyzed for the Hamiltonian system with externally applied non-conservative forces, wherein dynamic stability concepts are applied to modify the power flow with dissipation and generation feedback. A controller with optimal performance is selected for use in the WEC.

The WEC generally includes at least a first body and a second body coupled by a mechanical energy conversion chain, where waves impacting the WEC cause the first body to move relative to the second body. The WEC has a resonant frequency associated therewith, such that when waves cause the WEC to be at resonance, relatively large amplitude movement occurs between the first body and the second body. The mechanical energy conversion chain includes a power take off (PTO), which outputs electrical energy responsive to movement of the first body and the second body relative to one another. The controller can control the PTO to act as a motor, which can affect a natural displacement (movement) of the first body relative to the second body. Generally, the controller can cause the WEC to stay on resonance when wave frequency would otherwise cause the WEC to go off resonance as well as return movement of the WEC to the resonant frequency relatively quickly when the WEC is off resonance.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
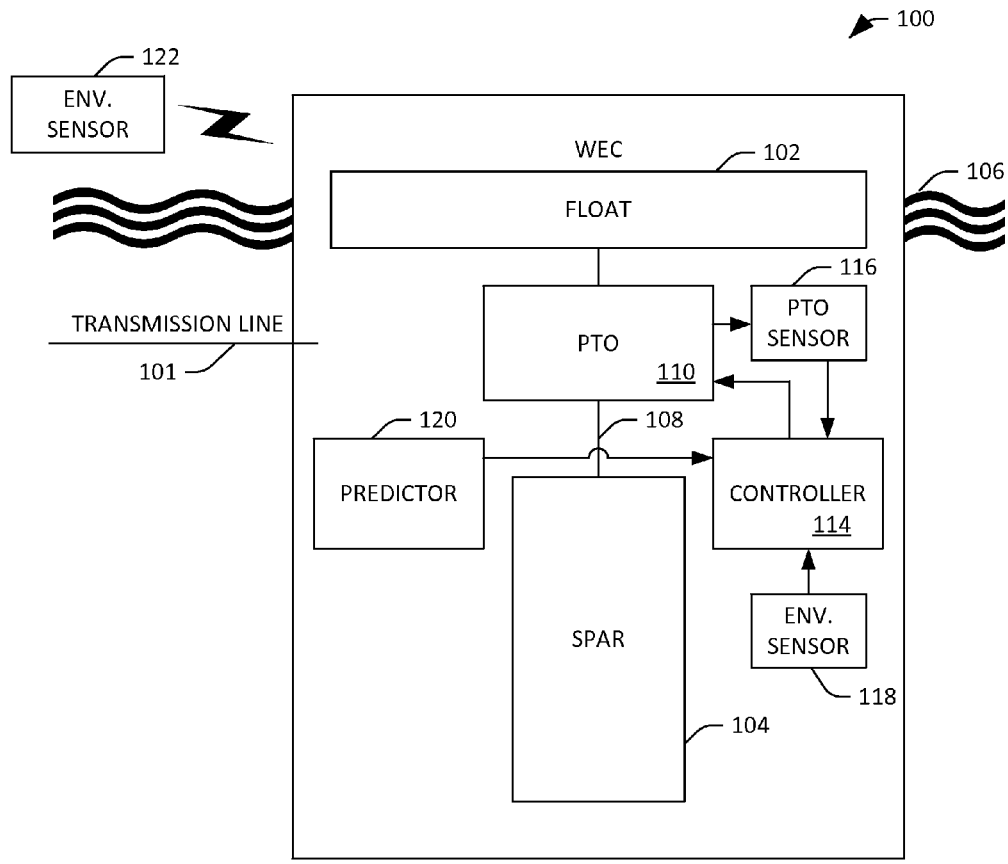
FIG. 1 illustrates an exemplary wave energy converter (WEC).

Various technologies pertaining to wave energy converters (WECs) are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

With reference now to FIG. 1, an exemplary wave energy converter (WEC) 100 is illustrated. The WEC 100 is intended to be placed in a body of water (e.g., the ocean) and subjected to wave motion of varying amplitude and frequency. The WEC 100 can be classified as a resonant responder, as its structural design can have a resonance frequency that is within a predominant wave frequency spectrum of the body of water in which the WEC 100 is deployed. In an example, the WEC 100 can have a resonant frequency of 8 seconds. Accordingly, when a series of 8-second waves impact the WEC 100, the WEC 100 will resonantly respond, thus absorbing a relatively large amount of energy of the waves that are impacting the WEC. It can be ascertained that while the exemplary WEC 100 is a two-body point absorber, aspects described herein are not limited to two-body point absorbers. Rather, aspects described herein can be utilized in any resonant WEC, including a one-body resonant WEC (e.g., a point absorber, terminator, or hybrid), a two-body resonant WEC (e.g., a point absorber, terminator, attenuator, or hybrid), and an n-body resonant WEC (e.g., a point absorber, terminator, attenuator, or hybrid).

Thus, the WEC 100 is configured to convert incident energy existent in waves into mechanical energy. The mechanical energy is than transformed into electrical energy, and can be transmitted by way of a transmission line 101 to a substation or other suitable energy or transmission system. Additionally, while not shown, the WEC 100 may include local storage, such as a battery, a capacitor bank, or the like, that can at least temporarily retain DC energy in the WEC 100. Further, the WEC 100 can extract such energy when needed, wherein extracted energy can be used to control the operation of the WEC 100, to provide power to lights on the WEC, to provide power to sensors on the WEC, to provide power to a processor or circuit that processes sensor data, to provide power to a transceiver that communicates to another system or WEC, etc.

The exemplary WEC 100 is shown as including two major wave responsive components: a float 102 and a spar 104 that is mechanically coupled to the float 102. The float 102 is designed to generally move (e.g., up and down) in phase with waves in a body of water 106. Such body of water 106 may be an ocean, a sea, a relatively large lake, etc. In an example, the spar 104 can remain stationary (e.g., anchored to an ocean-floor mooring) as the float 102 moves. In another example, the spar 104 can be configured to move generally out of phase with respect to the waves or in a delayed manner with respect to the waves, thereby moving relative to the float 102.

A mechanical energy conversion chain 108 couples the float 102 and the spar 104. The mechanical energy conversion chain 108 includes a power take off (PTO) 110. The PTO 110 is configured to convert the relative motion between the float 102 and the spar 104 to electrical energy, which can then be output by way of the transmission line 101. For example, the PTO 110 can include mechanical elements that are generally utilized, for example, to translate the vertical relative motion between the float 102 and the spar 104 into rotary motion. The PTO 110 can further include a generator that is configured to translate the rotary motion into electrical energy. Exemplary mechanical elements that can be included in the PTO 110 include, but are not limited to, a rack and pinion system, a hydraulic system, a flywheel, or a ball screw. Additional elements that can be included in the PTO 110 include, but are not limited to, a water turbine, an air turbine, a linear generator, etc.

As indicated above, the WEC 100 is structurally designed to have a resonant frequency within a predominant spectral range of waves in the body of water 106. Accordingly, when waves corresponding to the resonant frequency of the WEC 100 impact the WEC 100, relatively large amplitude vertical motion is created between the float 102 and the spar 104, wherein such motion is translated by the PTO 110 into electrical energy. Conventional WECs, however, tend to be relatively inefficient when waves in the body of water 106 do not correspond to the resonant frequency of the WEC 100.

To that end, the WEC 100 can include a controller 114 that is configured to control operation of the PTO) 110 to cause the PTO 110 to generate larger amounts of electrical energy over time when compared to conventional WECs. For instance, the controller 114 can be a PID controller. The controller 114 outputs control signals that are received by the PTO 110, and the PTO operates based upon the control signals received from the control 114. Thus, the controller 114 is configured to cause the PTO 110 to, when desirable, act as motor, such that the PTO 110 affects the displacement between the float 102 and the spar 104. For example, the PTO 110 can generally control the PTO 110 to cause the WEC 100 to remain on resonance when off-resonance waves impact the float 102, and can cause the WEC 100 to relatively quickly return to resonance when waves impacting the float 102 cause the WEC 100 to go off resonance. In other words, the controller 114 controls the PTO 110 to alter a phase relationship pertaining to the velocity of the float 102 with respect to an excitation force exerted by waves in the body of water 106 on the float 102. To that end, the controller 114 can cause the PTO 110 to exert a force on at least one of the float 102 or the spar 104, wherein the exerted force is in a direction of heave force exerted on the WEC 100 by an impinging wave. In another example, the controller 114 can cause the PTO 110 to exert the force on the at least one of the float 102 or the spar 104 in an opposite direction of heave force exerted on the WEC 100 by an impinging wave.

In an exemplary embodiment, the controller 114 can control the PTO 110 based at least in part upon a model of the WEC 100, wherein such model retains as many nonlinearities associated with the WEC 100 as possible. For instance, the WEC 100 can be modeled as a (nonlinear) Hamiltonian system, and the controller 114 can be designed based upon the modeling of the WEC 100 as the Hamiltonian system. Furthermore, the controller 114 utilizes reactive control techniques, whereby, as indicated above, the controller 114 can cause the PTO 110 to act as a motor. Additionally, the controller 114 can utilize adaptive control techniques, such that the controller 114 can consider variations in parameters that affect the operation of the WEC 100. Moreover, the controller 114 can take into consideration limitations of the PTO) 110 when outputting control signals to the PTO 110. For example, the PTO 110 includes mechanical elements that may be subjected to stress, torque, strain, etc. Accordingly, the controller 114 can be designed to take into consideration such limitations while controlling the PTO 110 to increase an amount of electrical energy generated by the WEC 100 compared to the amount of energy generated by the WEC 100 without the controller 114.

The controller 114 can take into consideration signals from a plurality of sensors when controlling operation of the PTO 110. For instance, a PTO sensor 116 can output a signal that is indicative of at least one operating parameter of the PTO 110. Such operating parameter may be, for example, an amount of electrical energy being generated by the PTO 110, positions of mechanical elements in the PTO 110, an amount of force being exerted by the PTO 110 on the float 102 and/or spar 104, etc. The controller 114 can receive a sensor signal from the PTO sensor 116, and can control operation of the PTO 110 based upon such sensor signal. Accordingly, for example, the controller 114 can be implemented as a feedback controller.

The WEC 100 may further include or be associated with an environmental sensor 118 that outputs a signal indicative of a condition of the WEC 100 relative to its environment. For instance, environmental sensor 118 can be configured to output positional information that indicates an elevation of the float 102 relative to a reference, a depth of the spar 104 relative to a reference, an amount of vertical displacement between the float 102 and the spar 104, etc. The controller 114 can be configured to control operation of the PTO 110 based at least in part upon a signal output by the environmental sensor 112.

In addition, the WEC can include a predictor 120 that can be or be included in a microprocessor, Application Specific Integrated Circuit (ASIC), Field Programmable Gate Array (FPGA), a System on a Chip (SoC), etc. For instance, a microprocessor can be programmed to perform functionality described below as being performed by the predictor 120. Likewise, an ASIC or FPGA can be designed and/or programmed to perform the functionality described below as being performed by the predictor 120. The predictor 120 predicts a time when a wave will impact float 102, as well as an elevation and phase of the wave at the time the wave is predicted to impact the float 102. With more particularity, another environmental sensor 122 can be positioned a distance (e.g., 100 meters) from the WEC 100, and can output a signal that is indicative of velocity of a wave, amplitude of the wave, etc. For instance, the environmental sensor 122 may have a wireless transceiver thereon, which is configured to transmit the signal to the WEC 100 (and the predictor 120). In another example, the environmental sensor 122 can be connected to the predictor 120 by way of a wired connection. The predictor 120 may further receive other signals from sensors that can be indicative of environmental conditions, such as wind speeds, humidity, and the like. The predictor component 120 can output the predicted time of impact of the wave with the WEC 100, elevation of the wave at the time of impact, and phase of the wave at the time of impact based upon the above-mentioned signals. Additionally, the predictor component 120 can generate the predictions based upon historically observed data pertaining to waves.

The controller 114 receives the predictions from the predictor 120, and controls operation of the PTO) 110 based upon the predictions. For instance, the controller 114 can receive the predictions and compute a desired position of the float 102 (e.g., elevation) at the time that the wave impacts the float 102. The controller 114 outputs control signals to the PTO 110, then, based upon the desired position of the float 102 at the future time, current position of the float 102, limitations of the PTO 110, an amount of power that needs to be employed by the PTO) 110 to place the float 102 in the desired position, etc.

Design of the controller 114 is now described. The controller 114 can be designed using a process referred to as Hamiltonian Surface Shaping and Power Flow Control (HISSPFC). HSSPFC is a two-step control law design process. In a first step of the process, the WEC 100 is modeled as a (nonlinear) Hamiltonian system, and the Hamiltonian system is treated as if it were a conservative system with no externally applied non-conservative forces. Such process enables the shaping of the Hamiltonian surface of the WEC with acceleration feedback and/or proportional feedback to create an isolated minimum (stable) energy state. Static stability can be utilized to find a first stability boundary; a rigid body mode (singular stiffness matrix), which defines the point of static neutral stability. In a second step of the process, the controller 114 can be designed for the Hamiltonian system with externally applied non-conservative forces, wherein dynamic stability concepts are applied to modify the power flow with dissipation and generation feedback.

Figure 2:
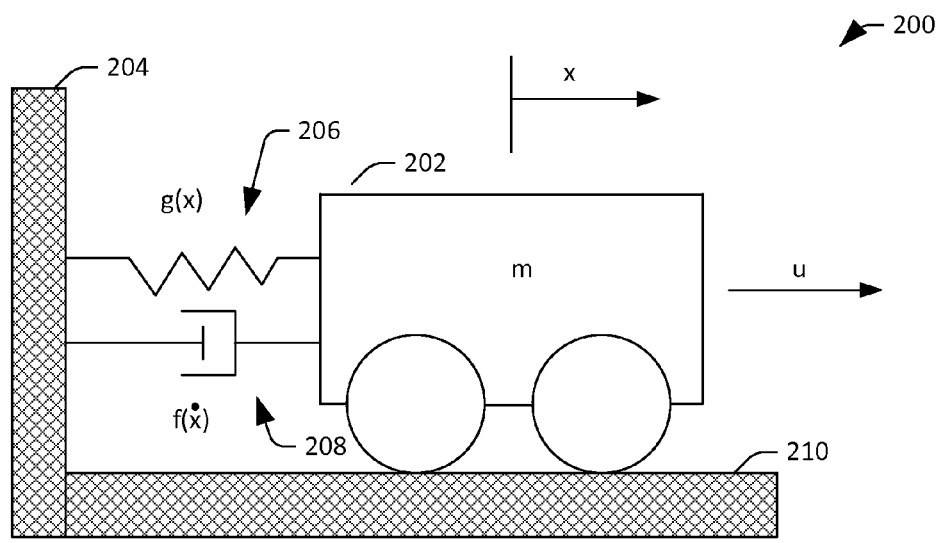
FIG. 2 illustrates an exemplary mass-spring-damper system that is presented in connection with designing a controller for a WEC.

With reference to FIG. 2, an exemplary mass-spring-damper (MSD) system 200 is illustrated, which can be analogized to the WEC 100 shown in FIG. 1. The MSD system 200 includes a mass 202 that is coupled to a wall 204 by a spring 206 and a damper 208. The mass 202 is moveable over a frictionless floor 210. The MSD system 200 can be modeled as a (nonlinear) Hamiltonian system (Hamiltonian). The mass 202 has a mass m, an external force x exerted thereon, a spring force g(x) exerted therein by the spring 206, and a damping force f(ẋ). u is the control force applied to the mass 202.

Accordingly, the following describes the MSD system 200:

$$m\ddot{x}+g(x)=-f(\dot{x})+u. \quad (1)$$

The energy of the MSD system 200 can be defined as follows:

$$H = E = \frac{1}{2}m\dot{x}^2 + V(x); \quad g(x) = \frac{\partial V(x)}{\partial x}, \quad (2)$$

where H is the Hamiltonian of the system MSD system 200, E is the energy of the MSD system 200, ½mẋ² is kinetic energy of the MSD system 200, and V(x) is kinetic energy of the MSD system 200. The Hamiltonian system is statically stabile for H being positive definite. It can be ascertained that the Hamiltonian set forth above includes at least one nonlinear term.

The time derivative of the energy storage surface defines the power flow dissipated within and stored in the MSD system 200. Accordingly, the MSD system 200 is dynamically stable if the following condition holds:

$$\dot{H}_{AVE}=1/\tau_c\int_0^{\tau_c}\dot{H}dt<0. \quad (3)$$

The MSD system 200 is dynamically unstable if the following condition holds:

$$\dot{H}_{AVE}=1/\tau_c\int_0^{\tau_c}\dot{H}dt>0. \quad (4)$$

The MSD system 200 is dynamically neutral stable (is at the limit cycle) under the following condition:

$$\dot{H}_{AVE} = \frac{1}{\tau_c}\oint_0^{\tau_c}\dot{H}dt = 0, \quad (5)$$

where $\tau_c$ is a period of the limit cycle.

The goal of the controller 114 is to control the PTO 110 such that power flow is maximized; e.g., the position of the WEC 100 with respect to waves in the body of water 106, over time, conforms to the resonant frequency of the WEC 100. The controller 114 can be designed in accordance with such goal.

Figure 3:
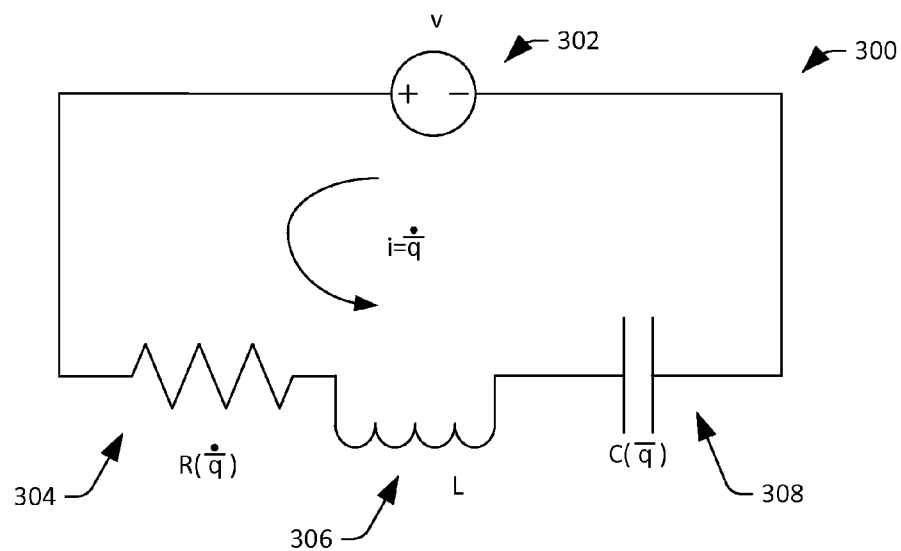
FIG. 3 illustrates an exemplary RLC circuit that is presented in connection with designing a controller for a WEC.

Turning to FIG. 3, an exemplary RLC circuit 300 that can be analogized to the MSD system 200 and the WEC 100 is illustrated. The RLC circuit 300 includes a voltage source 302, a resistor 304, an inductor 306, and a capacitance 308. As shown, the resistor 304 has a resistance R, the inductor 306 has an inductance L, and the capacitor 308 has a capacitance C. Current i, flowing through the circuit 300 equals the rate of change of charge q. In the exemplary circuit 300, q is not deterministic. Moreover, the circuit 200 can be modeled as a nonlinear Hamiltonian system.

An equation of motion (EOM) for the circuit 300 is as follows:

$$L\ddot{\bar{q}} = R(\dot{\bar{q}}) + 1/c(\bar{q}) = v = v_0 \cos \Omega t, \qquad (6)$$

where $$\dot{\bar{q}} R(\dot{\bar{q}}) > 0 \text{ for } \dot{\bar{q}} \neq 0; \text{ and}$$

$$\bar{q} C(\bar{q}) > 0 \text{ for } \bar{q} \neq 0. \qquad (7)$$

where $\Omega$ is the fundamental frequency of the voltage source. The (nonlinear) Hamiltonian of the RLC circuit 300 can thus be as follows:

$$H = \frac{1}{2} L \dot{\bar{q}}^2 + \int_0^{\bar{q}} C(y) dy, \qquad (8)$$

where $\frac{1}{2} L \dot{\bar{q}}^2$ is the kinetic energy, $\int_0^{\bar{q}} C(y) dy$ is the potential energy, and y is a variable of integration, where the limits of integration relate to, for example, charge, for $\bar{q}$, which is analogous to position (displacement) with respect to the MSD system 200. Again, it can be ascertained that such Hamiltonian includes at least one nonlinear term, and further includes at least one nondeterministic term.

The time derivative of the Hamiltonian of the RLC (and thus the power flow for the RLC circuit 300) can be defined as follows:

$$\dot{H} = [L\ddot{\bar{q}} + C(\bar{q})]\dot{\bar{q}} = [v - R(\dot{\bar{q}})]\dot{\bar{q}} = vi - R(i)i. \qquad (9)$$

Analogizing the WEC 100 to the RLC circuit 300, it can be ascertained that the controller 114 can be designed to cause a mechanical force to be output that places the WEC 100 on resonance (when waves of the body of water 106 are off-resonance). Thus, the controller 114 is designed to control the PTO 110 to cause the PTO 110 to output a mechanical force that places the WEC 100 at the desired limit cycle (e.g., its resonant frequency). Referring again to the RLC circuit 300, continuing with the analogy, a goal of a controller for the RLC circuit 300 is cause a designed voltage to create a desired limit cycle (e.g., 60 Hz for the electric grid). For a WEC device, the goal of the controller can be a function of a dominate frequency in a forcing function). The limit cycle is defined as follows:

$$\int_0^{\tau_c} [L\ddot{\bar{q}}\dot{\bar{q}} + C(\bar{q})\dot{\bar{q}}] dt = 0, \qquad (10)$$

where storage terms are matched, and:

$$\phi_0^{\tau_c} [vi - R(i)i] dt = 0, \qquad (11)$$

and vi is desirably maximally used by a connected load.

Continuing with the above-noted goal, the limit cycle can be as follows for matched storage terms and maximal real power:

$$\phi_0^{\tau_c} [L\ddot{\bar{q}} + C(\bar{q})]\dot{\bar{q}} dt = \phi_0^{\tau_c} [v - R(\dot{\bar{q}})]\dot{\bar{q}} dt = 0. \qquad (12)$$

In an example, the RLC circuit 300 can include nonlinear capacitance (Duffing oscillator) and nonlinear resistance (Coulomb friction-like), defined as follows:

$$L\ddot{\bar{q}} \left[ \frac{1}{C}\bar{q} + \frac{1}{C_{NL}}\bar{q}^3 \right] = v - R\dot{\bar{q}} - R_{NL} \text{ sign } (\dot{\bar{q}}), \qquad (13)$$

where NL denotes nonlinearity.

The Hamiltonian is then:

$$H = \frac{1}{2} L\dot{\bar{q}}^2 + \left[ \frac{1}{2}\frac{1}{C}\bar{q}^2 + \frac{1}{4}\frac{1}{C_{NL}}\bar{q}^4 \right], \qquad (14)$$

and the time derivative is:

$$\dot{H} = \left[ L\ddot{\bar{q}} + \left( \frac{1}{C}\bar{q} + \frac{1}{C_{NL}}\bar{q}^3 \right) \right]\dot{\bar{q}} = [v - R\dot{\bar{q}} - R_{NL} \text{ sign } (\dot{\bar{q}})]\dot{\bar{q}}. \qquad (15)$$

Taking into account the nonlinearities, reference trajectory, controller storage ($K_{cap}$), and the adaptive information potential ($\tilde{\Phi}^T \Gamma^{-1} \tilde{\Phi}$) terms results in the following Hamiltonian:

$$\bar{H} = \frac{1}{2} L\dot{e}^2 + \frac{1}{2}\frac{1}{C}e^2 + \frac{1}{2} K_{cap} e^2 + \frac{1}{4}\frac{1}{C_{NL}} e^4 + \frac{1}{2}\tilde{\Phi}^T \Gamma^{-1} \tilde{\Phi} = \qquad (16)$$
$$T + V + V_{CAP} + V_I,$$

and the first derivative:

$$\dot{\bar{H}} = \left[ L(\ddot{\bar{q}} - \ddot{\bar{q}}_R) + \left( \frac{1}{C} + K_{cap} \right)e + \frac{1}{C_{NL}} e^3 \right] (\dot{\bar{q}} - \dot{\bar{q}}_R) + \tilde{\Phi}\Gamma^{-1}\dot{\tilde{\Phi}}, \qquad (17)$$

where $$e = (\bar{q} - \bar{q}_R). \qquad (18)$$

A controller that causes the applied voltage to act as described above can be selected as:

$$v = v_R + \Delta v, \qquad (19)$$

where $$v_R = \hat{L}\ddot{\bar{q}}_R + \frac{\hat{1}}{C}\bar{q}_R + \frac{1}{C_{NL}}(\bar{q}^3 - e^3) + \hat{R}\dot{\bar{q}} + \hat{R}_{NL} \text{ sign } (\dot{\bar{q}}). \qquad (20)$$

and $\Delta v$ is a feedback portion of the control. $v_R$ is a reference dynamic state, which can be modeled by the dynamic equation above, wherein the goal is to drive the voltage of the RLC circuit 300 to $v_R$. Analogizing to the WEC 100, this can be the position of the WEC 100 that maximizes power output by WEC 100 for the wave velocity and phase output by the predictor 120.

If the ideal resonance frequency is represented as follows:

$$\omega^2 = 1/LC = \Omega^2, \qquad (21)$$

then $$v_R \dot{\bar{q}}_R = R\dot{\bar{q}}^2, \qquad (22)$$

where $\omega^2$ is a natural frequency of a combined controller and physical system and $\Omega$ is an incoming reference frequency. Accordingly, for the RLC circuit 300 to resonate, $\omega^2 = \Omega^2$. It can be ascertained that L and C are constant; however, controller can control a voltage source to cause inductance and capacitance of the circuit 300 to alter. Thus, if $$\omega^2 = 1/LC \neq \Omega^2, \quad (23)$$

then feedback control is required. To maintain a power factor of 1, $\Delta v$ can be selected as:

$$\Delta v = K_{cap} e - K_{gen} \int_0^t e d\tau - K_{diss} \dot{e}. \quad (24)$$

where $K_{cap}$ is augmented controller storage (capacitance) gain, $K_{gen}$ is augmented generation gain, and $K_{diss}$ is the augmented controller dissipation gain. This feedback control is used to shape the Hamiltonian surface as necessary to meet static stability conditions and determine stability and performance with respect to dynamic stability conditions. It can be noted that all gains can be selected during the design of the controller 114 as positive definite.

Substituting $v_R + \Delta v$ into the power flow equation (eq. (17)) provides the following:

$$\dot{H} = [-K_{gen} \int_0^t e d\tau - K_{diss} \dot{e}]\dot{e} + \tilde{\Phi}^T [Y^T \dot{e} + \Gamma^{-1} \dot{\tilde{\Phi}}]. \quad (25)$$

where $$Y\tilde{\Phi} = (\hat{L} - L)\ddot{\bar{q}}_R + \left(\frac{1}{\hat{C}} - \frac{1}{C}\right)\bar{q}_R + (\hat{R} - R)\dot{\bar{q}}, \quad (26)$$

$$\tilde{\Phi}^T = \left[(\hat{L} - L) \quad \left(\frac{\hat{1}}{C} - \frac{1}{C}\right) \quad (\hat{R} - R)\right], \quad (27)$$

$$\dot{\tilde{\Phi}}^T = \dot{\hat{\Phi}}^T = \left[\dot{\hat{L}} \quad \frac{\dot{\hat{1}}}{C} \quad \dot{\hat{R}}\right], \quad (28)$$

$$Y = \left[\ddot{\bar{q}}_R \quad \bar{q}_R \quad \dot{\bar{q}}_R\right]. \quad (29)$$

The adaptive parameter update equations including both nonlinear resistance and capacitance can then be defined as follows:

$$\dot{\hat{L}} = -\gamma_1 \ddot{\bar{q}}_R \dot{e}, \quad (30)$$

$$\frac{\dot{\hat{1}}}{C} = -\gamma_2 \bar{q}_R \dot{e}, \quad (31)$$

$$\dot{\hat{R}} = -\gamma_3 \dot{\bar{q}} \dot{e}, \quad (32)$$

$$\frac{\dot{\hat{1}}}{C_{NL}} = -\gamma_4 [\bar{q}^3 - \dot{e}^3]\dot{e}, \quad \text{and} \quad (33)$$

$$\dot{\hat{R}}_{NL} = -\gamma_5 \text{ sign}(\dot{q})\dot{e}, \quad (34)$$

where e has been defined in eq. (18), and $$e = (\bar{q} - \bar{q}_R) \quad (35)$$

The adaptation gains ($\gamma_i$) are selected as positive definite. This results in an asymptotically stable (passivity) condition:

$$\phi_0^{\tau_c}[-K_{gen}\int_0^t e d\tau']\dot{e} dt < K_{diss}\phi_0^{\tau_c} \dot{e}^2 dt. \quad (36)$$

It is noted that the nonlinear stability boundary condition is identified when these two terms are equivalent or are balanced over the cycle T. Controller gains can be selected based upon desired robustness/adaptiveness tradeoff.

Figure 4:
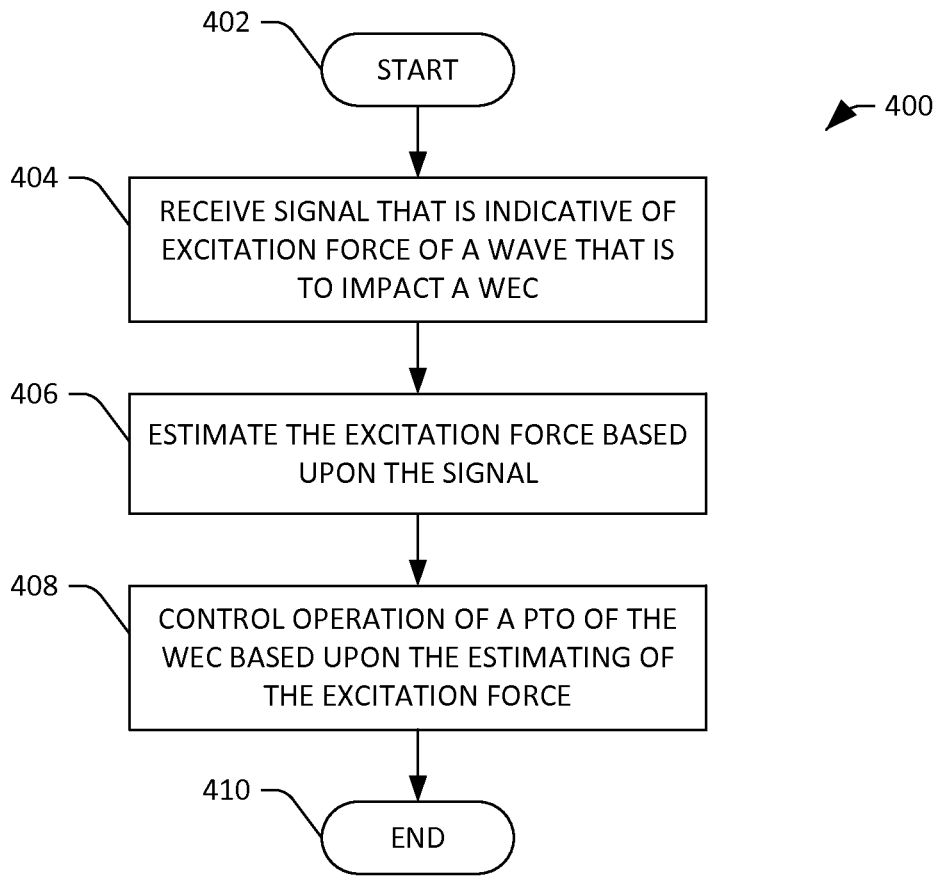
FIG. 4 is a flow diagram illustrating an exemplary methodology for controlling operation of a power takeoff (PTO) in a WEC.
Figure 5:
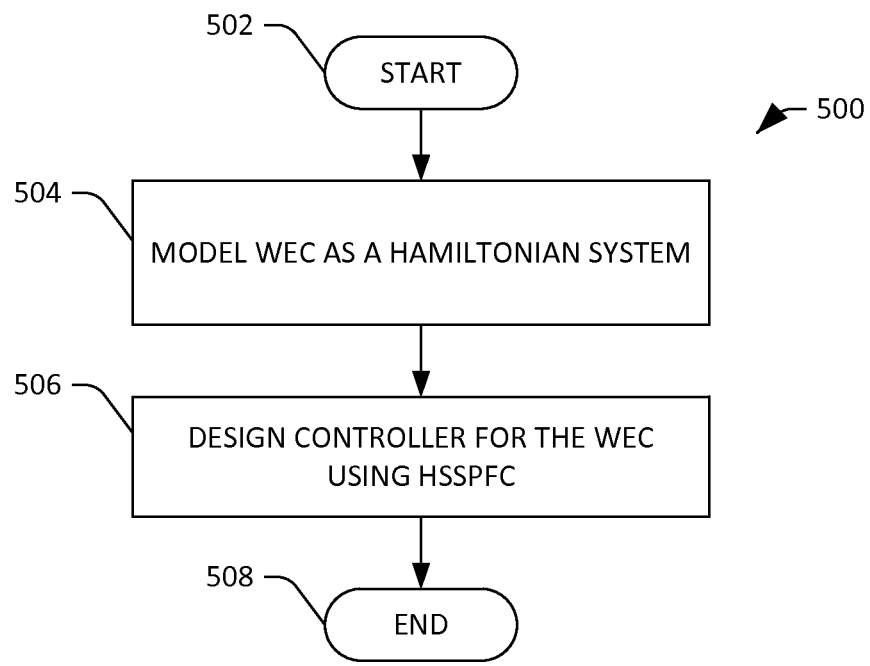
FIG. 5 is a flow diagram illustrating another exemplary methodology for designing a controller for a WEC using Hamiltonian Surface Shaping and Power Flow Control (HISSPFC).

FIGS. 4-5 illustrate exemplary methodologies relating to controlling a PTO of a WEC. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Now referring to FIG. 4, an exemplary methodology 400 for controlling a PTO in a WEC is illustrated. The methodology 400 starts at 402, and at 404, a signal that is indicative of an excitation force of a wave that is to impact the WEC is received. For instance, such signal can represent a velocity of a wave, an amplitude of a wave, etc. Further, such signal can indicate a predicted time in the future that the wave is to impact the WEC. At 406, the excitation force of the wave is estimated based upon the signal received at 404. At 408, operation of a PTO of the WEC is controlled based upon the estimating of the excitation force. In an exemplary embodiment, the controlling of the operation of the PTO can be performed by a controller which outputs control signals based upon a modeling of the WEC as a nonlinear Hamiltonian system. Further, the controlling of the operation of the PTO can include causing the PTO to act as a motor. The methodology 400 completes at 410.

Turning now to FIG. 5, an exemplary methodology 500 for designing a controller for a WEC is illustrated. The methodology 500 starts at 502, and at 504, a WEC is modeled as a (nonlinear) Hamiltonian system. At 504, the controller is designed for the WEC using HSSPFC techniques, which have been described above with reference to FIGS. 2 and 3. The methodology 500 completes at 508.

An exemplary computing system within which one or more aspects described herein can be incorporated is now set forth. With more particularity, one or more electric circuits can be configured to perform the functions described as being performed by the controller 114 and the predictor 120. In another example, a general purpose processor, such as a CPU or GPU, can be programmed with instructions that cause the general purpose processor to perform the functions described as being performed by the controller 114 and the predictor 120.

Figure 6:
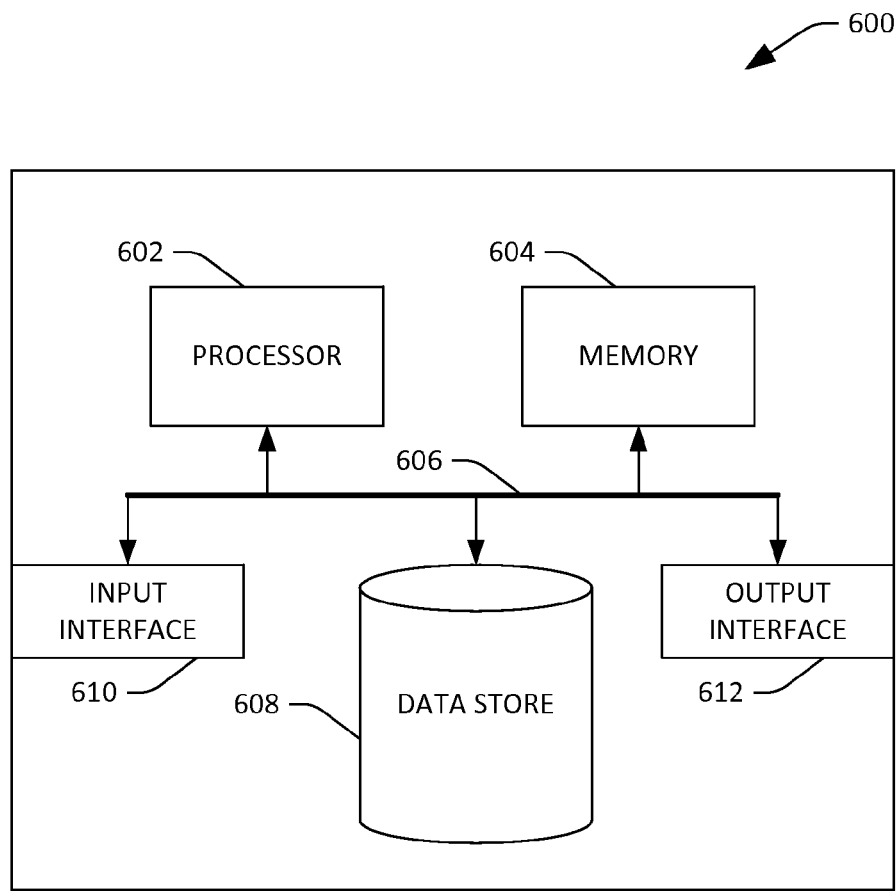
FIG. 6 illustrates an exemplary computing system.

Referring now to FIG. 6, a high-level illustration of an exemplary computing device 600 that can be programmed to perform the functionality described herein as being performed by the controller 114 and/or the predictor 120, and/or programmed to execute the methodology 400, is illustrated. The computing device 600 includes at least one processor 602 that executes instructions that are stored in a memory 604. The instructions may be, for instance, instructions for implementing functionality described as being carried out by the controller 114 and/or the predictor 120. The processor 602 may access the memory 604 by way of a system bus 606. In addition to storing executable instructions, the memory 604 may also store sensor signals or other suitable data.

The computing device 600 additionally includes a data store 608 that is accessible by the processor 602 by way of the system bus 606. The data store 608 may include executable instructions, sensor signals, etc. The computing device 600 also includes an input interface 610 that allows external devices to communicate with the computing device 600. For instance, the input interface 610 may be used to receive instructions from an external computer device, receive data from sensors, receive instructions from maintenance personnel for the WEC 100, etc. The computing device 600 also includes an output interface 612 that interfaces the computing device 600 with one or more external devices, such that the computing device 600 can transmit control signals to an actuator (e.g., driving the PTO 110).

Additionally, while illustrated as a single system, it is to be understood that the computing device 600 may be a distributed system. Thus, for instance, several devices may be in communication by way of a network connection and may collectively perform tasks described as being performed by the computing device 600.

As noted above, various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM. EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, as noted above, the functionally described herein as being performed by the controller 114 and/or the predictor 120 can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A wave energy converter (WEC) intended to be deployed in a body of water and subjected to wave motion of varying amplitude and frequency, the WEC having a resonant frequency associated therewith, the WEC comprising:
    a float;
    a spar, wherein waves impacting the float cause relative motion between the float and the spar,
    a power take off (PTO) that is configured to convert the relative motion between the float and the spar to electrical energy; and
    a controller that reactively controls operation of the PTO based upon a sensed condition pertaining to the WEC and a nonlinear model of the WEC,
    wherein the controller causes the PTO to exert a force on at least one of the float or the spar, and
    wherein the nonlinear model comprises a Hamiltonian model of the WEC, the Hamiltonian model comprising nonlinear terms.

2. The WEC of claim 1 being a point source WEC.

3. The WEC of claim 1, further comprising:
    a sensor that outputs a signal that is indicative of position of at least one of the float or the spar, the position being the sensed condition.

4. The WEC of claim 1, wherein the force exerted on the at least one of the float or the spar is in a direction of a force exerted on the WEC by an impinging wave.

5. The WEC of claim 1, wherein the force exerted on the at least one of the float or the spar is in an opposite direction of a force exerted on the WEC by an impinging wave.

6. The WEC of claim 1, further comprising a predictor that is configured to compute an estimate of a parameter of a wave that is to impact the WEC, the controller causes the PTO to exert the force based upon the estimate of the parameter of the wave.

7. The WEC of claim 6, wherein the parameter of the wave is one of velocity of the wave, amplitude of the wave, direction of the wave, or time that the wave is to impact the WEC.

8. The WEC of claim 6, wherein the parameter of the wave is a predicted excitation force of the wave when the wave impacts the WEC.

9. The WEC of claim 1, the PTO comprising at least one of a rack and pinion system, a hydraulic system, a flywheel, a ball screw, a water turbine, an air turbine, a linear generator, or a rotary generator.

10. The WEC of claim 1, the controller being a PID controller.

11. The WEC of claim 1, further comprising an energy storage system that stores electrical energy, wherein the PTO retrieves electrical energy stored in the energy storage system when exerting the force on the at least one of the float or the spar.

12. The WEC of claim 1, the controller using adaptive control to control operation of the PTO.

13. A method, comprising:
    receiving a signal that is indicative of an excitation force of a wave that is to impact a wave energy converter (WEC);
    estimating the excitation force based upon the signal; and
    controlling operation of a power take off (PTO) of the WEC,
    wherein the operation of the PTO is at least partially determined by the estimation of the excitation force, and
    wherein controlling operation of the PTO comprises causing the PTO to act as a motor, and wherein the controlling of the operation of the PTO comprises implementing a nonlinear model of the WEC, the nonlinear model being a Hamiltonian model of the WEC.

14. The method of claim 13, the WEC having a resonant frequency associated therewith, wherein the controlling of the operation of the PTO is based upon the resonant frequency.

15. The method of claim 13, further comprising receiving a sensor signal that is indicative of a position of the WEC relative to a wave, wherein the controlling of the operation of the PTO is based upon the sensor signal.

16. The method of claim 13, wherein the WEC is a point source WEC.

17. The method of claim 13, wherein the nonlinear model of the WEC includes operating constraints of the PTO.

18. The method of claim 13, wherein a controller is configured to perform the controlling of the operation of the PTO by way of adaptive control.

19. A wave energy converter (WEC), comprising:

a power take off (PTO) that is configured to generate electrical energy responsive to waves impacting the WEC, the WEC structurally designed to have a particular resonant frequency associated therewith; and a controller circuit, the controller circuit selectively causing the PTO to act as a motor, wherein the controller circuit receives at least one sensor signal, and wherein the controller circuit implements a nonlinear model of the WEC, the nonlinear model being a Hamiltonian model of the WEC.

20. The WEC of claim 19, the controller circuit selectively causes the PTO to exert a force in a direction that opposes a force exerted on the WEC by an impacting wave.

* * * * *